(12) United States Patent
Dekel et al.

(10) Patent No.: US 8,218,549 B2
(45) Date of Patent: Jul. 10, 2012

(54) SYNCHRONIZATION OF MESSAGE STREAM IN A MULTI-TIER MESSAGING SYSTEM

(75) Inventors: Eliezer Dekel, Haifa (IL); Gidon Gershinsky, Haifa (IL); Avraham Harpaz, Haifa (IL); Alexander Krits, Haifa (IL); Benjamin Mandler, Zichron Yaakov (IL); Nir Naaman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 11/764,232

(22) Filed: Jun. 18, 2007

(65) Prior Publication Data

US 2008/0310423 A1 Dec. 18, 2008

(51) Int. Cl.
*H04L 12/28* (2006.01)
*H04L 12/56* (2006.01)

(52) U.S. Cl. ....................................................... 370/394
(58) Field of Classification Search ................... 370/412, 370/329, 230, 394; 712/218
See application file for complete search history.

(56) References Cited

U.S. PATENT DOCUMENTS

| | | | |
|---|---|---|---|
| 4,653,048 A * | 3/1987 | Anderson et al. ................ | 714/49 |
| 5,799,146 A | 8/1998 | Badovinatz et al. | |
| 5,905,871 A | 5/1999 | Buskens et al. | |
| 6,195,680 B1 | 2/2001 | Goldszmidt et al. | |
| 6,507,586 B1 | 1/2003 | Satran et al. | |
| 6,650,629 B1 * | 11/2003 | Takahashi et al. ............. | 370/335 |
| 6,775,279 B2 * | 8/2004 | Murai et al. ................... | 370/390 |
| 6,959,323 B1 | 10/2005 | Tzeng et al. | |
| 6,983,293 B2 | 1/2006 | Wang | |
| 2004/0103342 A1 | 5/2004 | Moser et al. | |
| 2004/0264671 A1 * | 12/2004 | Lamberton et al. ....... | 379/221.03 |
| 2005/0286527 A1 * | 12/2005 | Tieu et al. ..................... | 370/394 |
| 2006/0153081 A1 * | 7/2006 | Simonsson et al. ........... | 370/238 |
| 2006/0168425 A1 * | 7/2006 | Del Vigna et al. ............ | 712/218 |
| 2008/0034105 A1 * | 2/2008 | Tsai et al. ..................... | 709/232 |
| 2008/0069120 A1 * | 3/2008 | Thomas ........................ | 370/401 |
| 2008/0159141 A1 * | 7/2008 | Soukup et al. ................ | 370/235 |
| 2008/0225698 A1 * | 9/2008 | Smith et al. ................... | 370/218 |
| 2008/0273545 A1 * | 11/2008 | Sgouros et al. ............... | 370/412 |

OTHER PUBLICATIONS

Chockler et al., "Group Communication Specifications: A Comprehensive Study," *ACM Computing Surveys* 33:4 (Dec. 2001), pp. 1-43.
Chiu et al., "Total Ordering Group Communication Protocol Based on Coordinating Sequencers for Multiple Overlapping Groups," *Journal of Parallel and Distributed Computing* 65 (2005), pp. 437-447.
M.F. Kaashoek et al., "Group communication in the Amoeba distributed operating system", 11th International Conference on Distributed Computing Systems (Cat. No. 91CH2996-7), 1991, 222-30.
L.E. Moser et al., "Totem: a fault-tolerant multicast group communication system", Communications of the ACM, v 39, n 4, Apr. 1996, p. 54-63.

* cited by examiner

*Primary Examiner* — Huy D Vu
*Assistant Examiner* — Adnan Baig
(74) *Attorney, Agent, or Firm* — Daniel Kligler

(57) ABSTRACT

A group communication service is adapted for multi-point to multi-point communication. Identical message streams are received by a tier of processing servers from a tier of sources. The processing servers deliver the message streams to a tier of destinations. The group communication service enables the processing servers to deal with newly added message streams and deleted message streams while preserving total ordering.

20 Claims, 2 Drawing Sheets

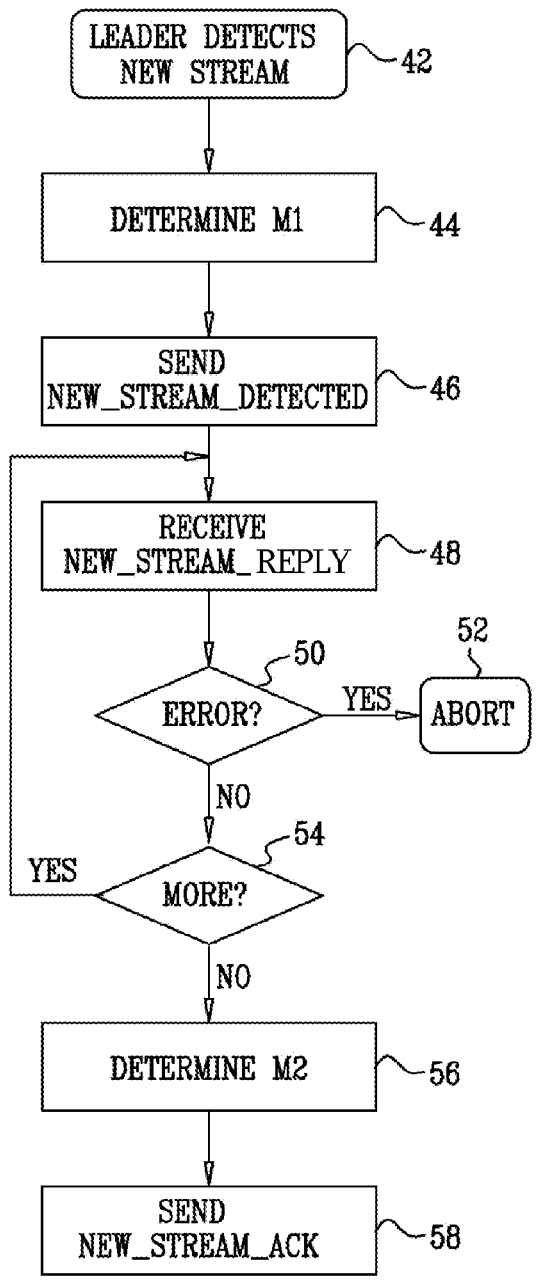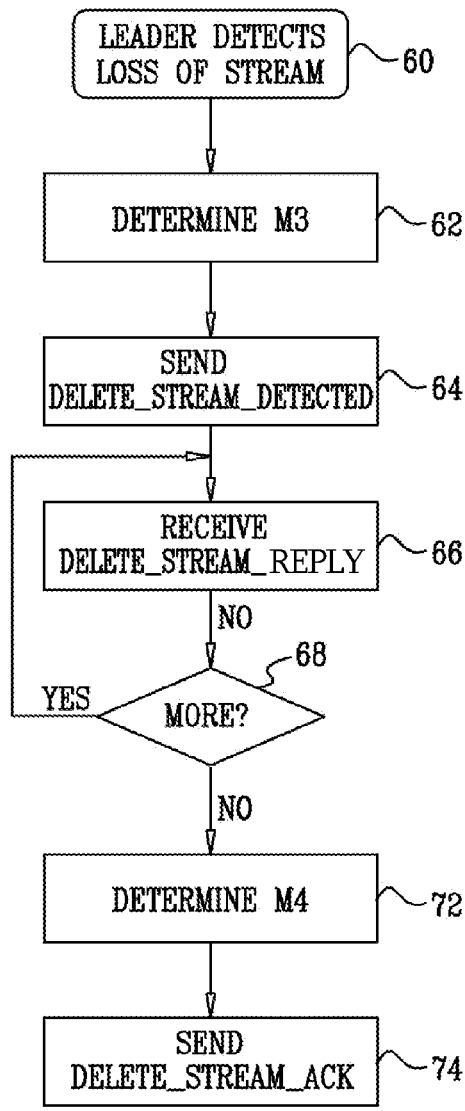

SYNCHRONIZATION OF MESSAGE STREAM IN A MULTI-TIER MESSAGING SYSTEM

CROSS-REFERENCE TO RELATED APPLICATIONS

Ts Application shares disclosure with Application Ser. No. 11/764233, entitled "Group Communication System", whose disclosure is herein incorporated by reference.

BACKGROUND OF THE INVENTION

1. Field of the Invention

This invention relates to communication of information across a data network. More particularly, this invention relates to improvements in message stream synchronization in a group communication service.

2. Description of the Related Art

TABLE 1

Acronyms and Abbreviations

| | |
|---|---|
| GCS | Group Communication System |
| PGM | Pragmatic General Multicast |
| QoS | Quality of Service |

A group communication service provides multi-point to multi-point communication by organizing processes in groups. A group is a set of communication entities, which includes processes executed by servers or computers that are members of the group.

Distributed group communication systems (GCSs) enable applications to exchange messages within groups of processes in a cluster of computers. A group communication system provides a variety of semantic guarantees for the messages being exchanged, such as reliability, synchronization, and ordering. For example, in response to an application request, a group communication system may ensure that if a message addressed to the entire group is delivered to one of the group members, the message will also be delivered to all other live and connected members of the group, so that group members can act upon received messages and remain consistent with one another.

Chockler et al. provide a useful overview of group communication systems in "Group Communication Specifications: A Comprehensive Study," *ACM Computing Surveys* 33:4 (December, 2001), pages 1-43, which is herein incorporated by reference. This paper focuses on view-oriented group communication systems, which provide membership and reliable multicast services to the member processes in a group. The task of a membership service is to maintain a list of the currently active and connected processes in the group. The output of the membership service is called a "view." The reliable multicast services deliver messages to the current view members.

Various methods are known in the art for maintaining the desired message delivery order in a group communication system. Chiu et al. describe one such ordering protocol, for example, in "Total Ordering Group Communication Protocol Based on Coordinating Sequencers for Multiple Overlapping Groups," *Journal of Parallel and Distributed Computing* 65 (2005), pages 437-447, which is herein incorporated by reference. Total order delivery, as described in this paper, is characterized by requiring that messages be delivered in the same relative order to each process. The protocol proposed by the authors is sequencer-based, i.e.: sequencer sites are chosen to be responsible for ordering all multicast messages in order to achieve total order delivery.

A reliable multicast protocol is often used to send and receive messages in group communication systems. Reliable multicast protocols use message or packet streams to deliver messages. An example of such a protocol is Pragmatic General Multicast (PGM), the specification of which is presented in Network Working Group RFC 3208. Each stream is globally unique and is the basic entity over which reliability is maintained. PGM supports any number of sources within a multicast group, each fully identified by a globally unique transport session identifier.

The PGM protocol proposes a 'late-join' option that may help to synchronize several receivers in order that they all start processing packets of a new stream from the same packet. Late joining allows a source to indicate what packets or messages receivers may request from the source's history buffer when they first receive a stream.

Another reliable multicast transport arrangement is disclosed in commonly assigned U.S. Pat. No. 6,507,586, whose disclosure is herein incorporated by reference. A data transmission system is described, which has a single transmitter and a plurality of receivers where the transmitter sends a group of data items to a subset of receivers over a one-way channel.

Another approach to message ordering is proposed in U.S. Pat. No. 6,959,323, issued to Tzeng, et al. This document describes a protocol for synchronizing states of nodes in a distributed multicasting environment. The arrangement employs a dedicated sequencer, which is responsible solely for assigning sequence numbers to multicast messages. The sequencer does not multicast the messages. Commit servers store the ordering information for each message. Data servers store the data messages sent to the group. Messages are consolidated using checkpoint servers, and sent to clients. The arrangement purports to ensure both atomicity and total order among messages sent to a multicast group.

SUMMARY OF THE INVENTION

An embodiment of the invention provides a computer-implemented method for communication, which is carried out by receiving source streams of data messages in a plurality of processing servers from a plurality of sources, and delivering the data messages from the processing servers in respective identical delivery streams to a plurality of recipients. Corresponding data messages of the delivery streams have identical message content, and the delivery streams exit the processing servers in identically sequenced units. The method is further carried out by detecting in a leader of the processing servers a new source stream, exchanging protocol messages only between the leader and others of the processing servers in order to determine a common extreme message in the new source stream that can be processed by all of the processing servers, and initiating inclusion of the new source stream at the common extreme message in the delivery streams.

An embodiment of the invention provides a computer-implemented method for communication, which is carried out by receiving source message streams of data messages in a plurality of processing servers from a plurality of sources, and delivering the data messages from the processing servers in respective identical delivery streams to a plurality of recipients. Corresponding data messages of the delivery streams have identical message content, and the delivery streams exit the processing servers in identically sequenced units. The method is further carried out by detecting in the leader a discontinued source stream, exchanging protocol messages only between the leader and others of the processing servers in order to determine a common extreme message in the discontinued source stream that can be processed by all of the processing servers, and initiating discontinuation of the discontinued source stream at the common extreme message in the delivery streams.

Other embodiments of the invention provide computer software product and apparatus for carrying out the above-described methods.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein:

FIG. 2 is a flow chart illustrating a method of addition of a new message stream by a group communication service in accordance with a disclosed embodiment of the invention; and FIG. 3 is a flow chart illustrating a method of removal of an existing message stream by a group communication service in accordance with a disclosed embodiment of the invention.

DETAILED DESCRIPTION OF THE INVENTION

Figure 1:
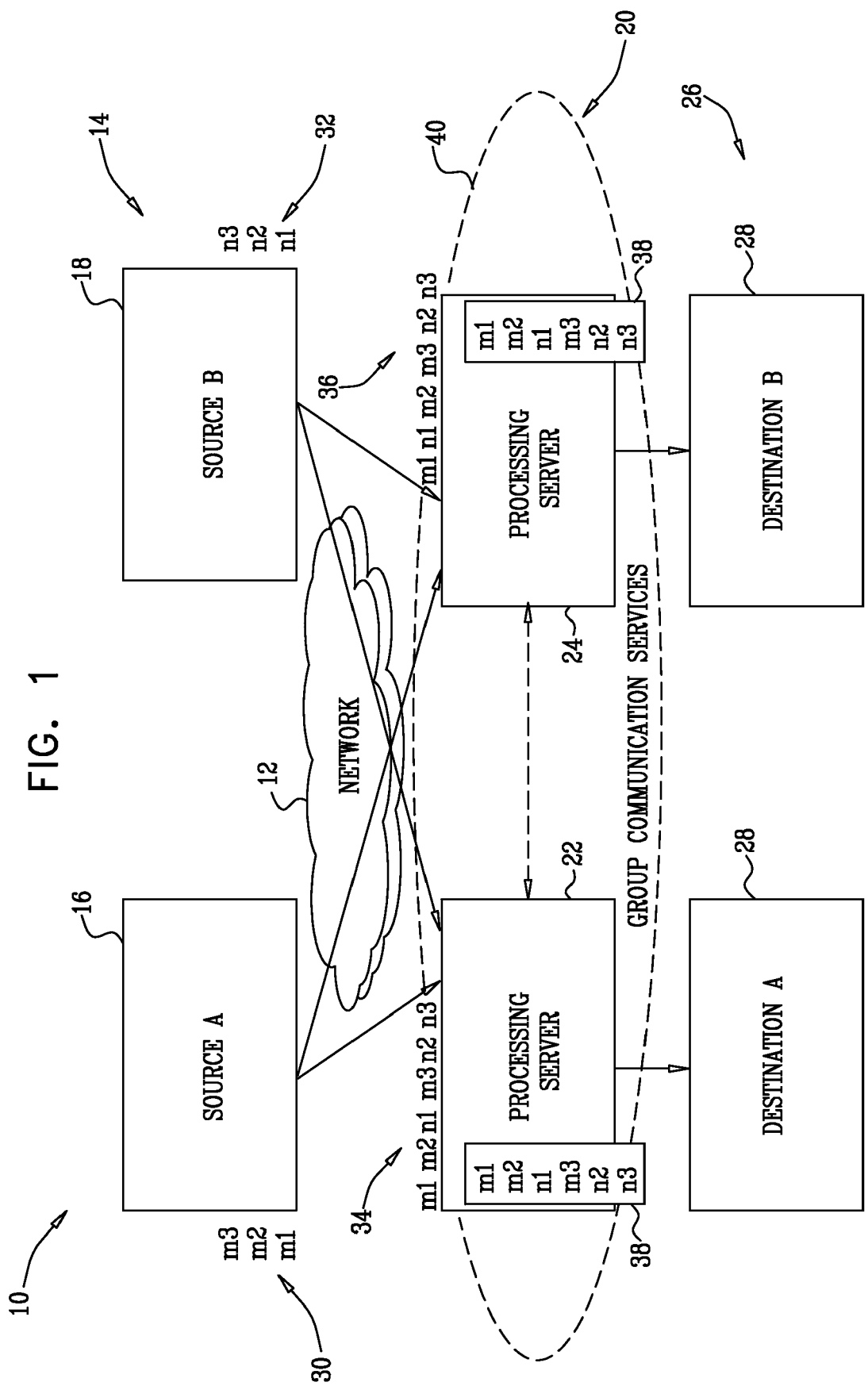
FIG. 1 is a block diagram of an exemplary multi-tiered cluster of nodes connected in a network that is operative in accordance with an embodiment of the present invention.

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems.
Overview.

Turning now to the drawings, reference is initially made to FIG. 1, which is a block diagram of an exemplary multi-tiered cluster 10 of nodes connected by a network 12, in accordance with an embodiment of the present invention. Each node comprises a computer processor and a communications adapter linking the node to the network. Different nodes may comprise different types of computers or servers, which may also have different operating systems.

The cluster 10 includes a sources tier 14, having any number of sources, represented in FIG. 1 by sources 16, 18. A servers tier 20 comprises two or more processing servers, represented in FIG. 2 by servers 22, 24, which receive messages from nodes of the sources tier 14. Multiple servers are desirable in the servers tier 20 for reasons of fault tolerance and availability. The cluster 10 has a destinations tier 26 that has any number of destinations 28. The destinations 28 process the messages that are sent to them by the servers 22, 24. In general, the sources 16, 18 are unaware of the destinations 28. Furthermore, in different embodiments of the cluster 10, the servers comprising the servers tier 20 may have different capabilities, e.g., processing speed and buffer capacity.

The sources 16, 18 transmit electronic messages as message stream 30 $m_1 \ldots m_n$ and message stream 32 $n_1 \ldots n_n$ via the network 12 to the servers 22, 24 using a known reliable multicast transport protocol, which can be the aforementioned PGM protocol.

In general, the sources 16, 18 are not time-synchronized with one another or with the servers 22, 24, and different streams are received asynchronously by the servers tier 20. The messages of the stream are associated with sequence numbers that change monotonically. A "maximum sequence number" of a stream of messages, as used herein, is associated with the latest message in a segment of the stream. A "minimum sequence number" is associated with the earliest message. The terms maximum sequence number and minimum sequence number are used arbitrarily herein to distinguish relatively late arriving messages from early arriving messages, but otherwise have no meanings with respect to the actual sequencing scheme used in the message streams.

While the received message sequence order of each stream at the servers 22, 24 is guaranteed by the reliable multicast transport protocol, due to network latencies, the servers 22, 24 are not guaranteed to receive any given message at the same time from any of the streams. For example, the servers 22, 24 have received the message streams 30, 32 in different message orders 34, 36, respectively.

Nevertheless, from the perspective of the destinations 28, the servers 22, 24 are required to be interchangeable, in that their message transmission sequences are delivered in identical message orders 38.

In general, the ordering properties of the group communication service restrict the order in which messages are delivered, and the reliability properties of the reliable multicast protocol extend the ordering properties by prohibiting gaps in the sequence of messages.

There is a total message ordering, in the sense that messages, or messages derived from incoming messages sent by the sources 16, 18, for example, using messaging middleware, are processed by each of the servers 22, 24 in exactly the same order. As a result of processing by the servers 22, 24, any number of new messages may be generated and sent to the destinations 28. At the destinations 28, total ordering is not required in order to implement the principals of the invention.

According to aspects of the invention, total message ordering at the servers 22, 24 is achieved using a group communication service 40 into which the servers 22, 24 are organized, and which forms an underlying membership layer.

Notably, the group communication service 40 excludes any server outside the servers tier 20. The servers 22, 24 are synchronized to process all the messages sent by the sources 16, 18 in the same way in order to maintain a total message order. In order to maintain message synchronization the servers 22, 24 need to intercommunicate efficiently. Organization and operation of the group communication service 40 can be mediated, for example, by a group services daemon that executes in one or more of the servers 22, 24. The daemon may execute or facilitate various communication and synchronization tasks among the servers 22, 24 that are disclosed in further detail hereinbelow.

Messages may be combined into transport packets by the sources 16, 18. Thus, the servers 22, 24 synchronize based on transport packet sequences rather than individual message sequences, under direction of a leader in order to achieve total ordering. Processing of such packets streams is performed in the same manner as individual message streams, as described below.

Facilities provided by the group communication service include maintenance of a consistent list of group members, group leader election, and message delivery with specific quality of service guarantees. Messages transmitted among the servers 22, 24 via the group communication service are referred to herein as "protocol messages". Their format and communications protocol is not necessarily the same as the reliable multicast protocol used to receive and deliver message streams between the group communication service members and the sources and destinations, which are external to the group communication service. Every so often, the group leader determines the sequence in which incoming messages should be handled, and transmits this information to all other active servers in an "ordering information" protocol message. After the ordering information protocol message has been acknowledged by return protocol messages from the other servers in the servers tier 20, all the servers 22, 24 of the group communication service 40 process the data messages, which were covered by the ordering information message as directed. A unified time stamp mechanism is provided in the group communication service 40 that ensures that messages sent from each of the servers 22, 24 to their respective destinations 28 based on the same incoming message have exactly the same time stamp.

Group Communication Service—Synchronization.

In systems like the cluster 10, when a source creates a new message stream and starts sending messages, the servers at the next tier may detect and start to receive the message stream at different messages in the stream. Similarly, when the source discontinues a message stream, the servers at the next tier may have received a different set of messages.

In conventional group communication service implementations, all nodes, including source and destination tiers, are treated as part of the group. An addition or deletion of a message stream normally triggers a view change intended to synchronize all group members on the new state. The relatively high overhead of network traffic is a disadvantage of such an arrangement. According to an aspect of the invention, the group communication service 40 is limited to the servers tier 20, and excludes the nodes of the sources tier 14 and the destinations tier 26. As a result, network traffic is considerably reduced, and scalability and latency are improved.

In the group communication service 40, one of the servers 22, 24 acts as a leader. In addition to its principal task of message transmission, the leader is assigned an additional task of maintaining synchronization of message stream addition and deletion operations. The leader is, of course, burdened with many other group communication service tasks that are outside the scope of this disclosure, e.g., membership services, and maintaining general state synchronization among the servers 22, 24. These may be dealt with according to the teachings of the above-noted application Ser. No. 11/764233.

In dealing with new and discontinued message streams, protocol messages are exchanged between the leader and the other servers. Protocol messages are small. In the example of Table 2, the payload is 13 bytes, although this is increased somewhat by a group communication header and network overhead (not shown).

TABLE 2

| Field | Bytes |
|---|---|
| Message Type | 1 |
| Stream Identifier | 8 |
| Packet (message) Sequence No. | 4 |

In one embodiment, for reasons of performance, such protocol messages are sent using a QoS setting of real synchrony, which is provided by the underlying group communication service. When real synchrony is in force, the sender of a message is blocked until the Group Communication System ensures that all the receivers have acknowledged receipt the message. Alternatively, the sender may be blocked until a predetermined number of acknowledgement signals (ACKs) have been received. The use of real synchrony is advantageous, as it provides the highest guarantee that a message has been delivered to all receivers. Alternatively, other QoS methods can be used.

When the leader detects a new message stream from the sources tier 14, it starts a communications session with each of the other servers 22, 24, according to a predefined three-way handshake protocol. After completion of the session, all the servers 22, 24 are synchronized such that they start processing messages from the new stream at exactly the same message in the stream. Similarly, when the leader detects that a stream is no longer active, it starts another three-way session with the other servers 22, 24, according to another predefined protocol. After completion of the other session, all the servers 22, 24 process residual messages from the discontinued stream up to exactly the same message in the stream. In both cases, messages in the stream not processed are discarded in order to free memory buffers. The first message to be processed in a new stream and the last message to be processed in a discontinued stream is a common extreme message that is able to be handled by all of the servers 22, 24, including the leader. It should be noted that a view change is not permitted during a synchronization operation in response to a new or deleted message stream. If a view change becomes indicated during stream addition or deletion, it may be deferred until after completion of the synchronziation operation. However, if it cannot be deferred, the synchronzation process is aborded and reattempted on the new view In the description of the following methods, process steps are shown in particular linear sequences for clarity of presentation. However, these sequences are exemplary. In different embodiments, many of them may be performed in parallel, asynchronously, or in different orders.

Stream Addition.

Reference is now made to FIG. 2, which is a flow chart illustrating a method of addition of a new message stream by a group communication service in accordance with a disclosed embodiment of the invention. The group communication service is limited to nodes of a processing tier, i.e., the servers tier 20 in FIG. 1. It is assumed that a leader has been elected and the group communication service is operating.

At initial step 42, the group communication service leader detects a new message stream, which needs to be added to the messages being processed and delivered to the destinations. It will be recalled that the constitution and order of transmission of the individual streams being sent by the servers tier must all be identical.

Next, at step 44, the leader inspects the new stream, and determines the first stream message (M1), that it can process.

Next, at step 46, a protocol message (NEW_STREAM_DETECTED) is transmitted to all other servers of the group communication service. This protocol message includes an identifier of the new stream, and a sequence number that identifies the stream message M1 to the other processing servers. In some embodiments, the sequence number can be omitted in the NEW_STREAM_DETECTED protocol message. However, it is normally included, as it has minimal cost, and in some circumstances, could facilitate optimization in the recipient. For example, a server that received messages smaller than M1 may discard them immediately, and not await completion of the synchronization protocol.

As noted above, this protocol message and the other protocol messages described below have assured delivery by the QoS of the group communication service. Furthermore, none of the protocol messages are directed to, nor acknowledged by servers outside the processing tier.

Next, at step 48, the leader receives a protocol reply message (NEW_STREAM_REPLY) from one of the other servers of the group communication service. The reply message includes an indication whether the new stream was detected by the replying server. If so, the message also includes the sequence number of the new stream at which processing by the replying server can begin.

Control now proceeds to decision step 50, where it is determined if the message received in the current iteration of step 48 contains an error code, indicating that the new stream was not detected.

If the determination at decision step 50 is affirmative, then control proceeds to final step 52. The leader aborts the current synchronization operation. A protocol error message is transmitted to the other servers of the group communication service, directing them to also abort the synchronization operation. Once the synchronization operation has been aborted, each server may discard messages of the new stream in order to free buffers. This feature avoids depletion of buffers and buffer overruns, which would risk disruption to other ongoing existing server communications. The leader may reinitiate the synchronization operation on the new stream at any time by reverting to step 44 or step 46.

If the determination at decision step 50 is negative, then the synchronization operation is proceeding normally. Control now proceeds to decision step 54, where it is determined if more replies from the other servers of the group communication service remain to be evaluated. If the determination at decision step 54 is affirmative, then control returns to step 48. Many non-serial implementations of the loop defined by step 48, and decision steps 50, 54 will occur to those skilled in the art. For example, all the servers may be polled concurrently.

If the determination at decision step 54 is negative, then control proceeds to step 56. All the replies were valid. Now the leader finds the maximum sequence number (M2) that was sent in the reply messages.

Next, at final step 58, the leader transmits a protocol message (NEW_STREAM_ACK) indicating that processing on the new stream may begin. The stream identifier and the sequence number M2 are incorporated in this message. When the other servers of the group communication service receive the message all of them, including the leader, begin delivering messages from the new stream, beginning at the sequence number M2.

Stream Deletion.

Reference is now made to FIG. 3, which is a flow chart illustrating a method of removal of an existing message stream by a group communication service in accordance with a disclosed embodiment of the invention. The procedure for synchronizing stream deletion is similar in many respects to that for stream addition. At initial step 60, the leader detects the loss of an existing message stream. Typically, this is done using known heartbeat mechanisms. Additionally or alternatively, other known failure detection mechanisms can be applied. For example hardware detection failure mechanisms, or detection of a broken connection.

Next, at step 62, the leader inspects the undelivered portion of the deleted stream and determines that it can process messages up to a particular message (M3).

Next, at step 64, the leader sends a protocol message (DELETE_STREAM_DETECTED) to the other servers of the group communication service, indicating that a message stream has been deleted. This protocol message includes an identifier of the deleted stream, and a sequence number that identifies the message M3 to the other servers.

Each server that receives a DELETE_STREAM_DETECTED message must return a protocol message (DELETE_STREAM_REPLY) to the leader. As noted above, detection of server failure at this point is provided by the group communication service. Should it occur at this point, synchronization is aborted, and can be subsequently reattempted. Differentiation of a server that is slow to respond from one that has failed can sometimes be difficult. However, as the servers continue processing messages during the synchronization process, in general no delay is introduced by a slow server.

Next, at step 66 a DELETE_STREAM REPLY message is received from all the servers of the group communication service. This message includes the stream identifier, and a sequence number that identifies the last message of the deleted stream that can be processed by the sender of the DELETE_STREAM_REPLY message. The considerations of implementing the loop in FIG. 3 apply equally to the loop defined by step 66 and decision step 68.

Control now proceeds to decision step 68, where it is determined if replies are awaited from more servers of the group communication service.

If the determination at decision step 68 is affirmative, then control returns to decision step 66.

If the determination at decision step 68 is negative, then the leader has received a reply from all of the servers of the group communication service. Control proceeds to step 72. The leader inspects the DELETE_STREAM_REPLY messages and determines the minimum sequence number (M4) that can be processed by the servers of the group communication service.

At final step 74, the leader transmits a protocol message (DELETE_STREAM_ACK) to the other servers of the group communication service. This message includes the stream identifier and the sequence number M4. Each recipient server continues to deliver messages of the deleted stream, including the message corresponding to the sequence number M4 but no further. The server then discards unsent messages, and deletes the stream from its list of active message streams.

In some embodiments, an additional phase of final step 74 is included, in which missing messages are distributed to all servers of the group communication service. This assures that all the servers process the largest possible set of messages from the deleted stream. Alternatively, the missing messages may be retained by the servers rather than discarded. They can be delivered to destinations that request them. Requesting missing content is a feature offered by many known reliable multicast protocols.

EXAMPLE

A prototype system has been tested using three processing servers in a GCS group. A TCP protocol was used for protocol messages. It has been found that a synchronization operation can be accomplished in less than 100 ms. Analysis of packet receipt confirms preservation of total order.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for communication, comprising:
arranging a group of servers to receive multiple streams of multicast messages from message sources outside the group of servers and to deliver the multiple streams of multicast messages to recipients;
receiving a new message stream from a source at the group of the servers including at least a first server in the group;
upon receiving the new message stream at the first server, transmitting first protocol messages from the first server to the other servers in the group in order to verify that the other servers have received the new message stream;
upon verifying that the other servers have received the new message stream by receiving replies from the other servers to the first protocol messages, sending a second protocol message from the first server to the other servers, instructing the other servers to begin processing the new message stream; and
responsively to the second protocol message, adding the new message stream to the multiple streams delivered to the recipients from the servers and causing the servers to deliver all the multicast messages from all the message streams to all the recipients in the same order.

2. The method according to claim 1, wherein the multicast messages in each stream have respective sequence numbers, and wherein exchanging the first protocol messages comprises identifying a given sequence number of the multicast messages in the new message stream that was received by all of the servers in the group, and wherein adding the new message stream comprises causing the servers to begin delivering the multicast messages in the new message stream beginning from the given sequence number.

3. The method according to claim 2, wherein the first protocol messages identify respective sequence numbers of the multicast messages at which the servers are able to begin processing the new message stream, and wherein identifying the given sequence number comprises finding a maximum of the respective sequence numbers.

4. The method according to claim 1, and comprising:
detecting at the first server that a given stream among the multiple streams of the multicast messages has been lost; and
exchanging third protocol messages between the first server and the other servers in the group so as to cause all the servers in the group to stop delivering the given stream following a last sequence number of the multicast messages in the given stream.

5. The method according to claim 4, wherein exchanging the third protocol messages comprises identifying, using the third protocol messages, the last sequence number of the multicast messages in the given stream that were received by all the servers in the group.

6. The method according to claim 1, wherein sending the second protocol message comprises synchronizing, among the servers in the group, the new message stream with the multiple streams so as to cause all the servers to deliver all of the multicast messages to all the recipients in respective, identically-sequenced delivery streams.

7. The method according to claim 1, wherein the messages sources and the recipients are outside the group, and the streams of the multicast messages are received by the servers from the messages sources in an unsynchronized and unpredetermined order, and wherein the first and second protocol messages are exchanged only among the servers in the group.

8. A computer software product for communication including a tangible non-transitory computer-readable storage medium in which computer program instructions are stored, which instructions, when executed by a group of servers, cause the servers to:
receive multiple streams of multicast messages from message sources outside the group of the servers and to deliver the multiple streams of multicast messages to recipients;
receive a new message stream from a source at the group of the servers including at least a first server in the group;
transmit, upon receiving the new message stream at the first server, first protocol messages from the first server to the other servers in the group in order to verify that the other servers have received the new message stream;
upon verifying that the other servers have received the new message stream by receiving replies from the other servers to the first protocol messages, send a second protocol message from the first server to the other servers, instructing the other servers to begin processing the new message stream; and
responsively to the second protocol message, add the new message stream to the multiple streams delivered to the recipients from the servers and cause the servers to deliver all the multicast messages from all the message streams to all the recipients in the same order.

9. The product according to claim 8, wherein the multicast messages in each stream have respective sequence numbers, and wherein the first protocol messages identify a given sequence number of the multicast messages in the new message stream that was received by all of the servers in the group, and wherein the instructions cause the servers to begin delivering the multicast messages in the new message stream beginning from the given sequence number.

10. The product according to claim 9, wherein the first protocol messages identify respective sequence numbers of the multicast messages at which the servers are able to begin processing the new message stream, and wherein the given sequence number is identified as a maximum of the respective sequence numbers.

11. The product according to claim 8, wherein the instructions cause the servers to:
detect at the first server that a given stream among the multiple streams of the multicast messages has been lost; and
exchange third protocol messages between the first server and the other servers in the group so as to cause all the servers in the group to stop delivering the given stream following a last sequence number of the multicast messages in the given stream.

12. The product according to claim 11, wherein the third protocol messages identify the last sequence number of the multicast messages in the given stream that were received by all the servers in the group.

13. The product according to claim 8, wherein the instructions cause the servers to synchronize, among the servers in the group, the new message stream with the multiple streams so as to deliver all of the multicast messages to all the recipients in respective, identically-sequenced delivery streams.

14. The method according to claim 8, wherein the messages sources and the recipients are outside the group, and the streams of the multicast messages are received by the servers from the messages sources in an unsynchronized and unpredetermined order, and wherein the first and second protocol messages are exchanged only among the servers in the group.

15. A communications apparatus, comprising a plurality of servers arranged in a group and configured to:
  receive multiple streams of multicast messages from message sources outside the group of the servers and to deliver the multiple streams of multicast messages to recipients;
  receive a new message stream from a source at the group of the servers including at least a first server in the group;
  transmit, upon receiving the new message stream at the first server, first protocol messages from the first server to the other servers in the group in order to verify that the other servers have received the new message stream;
  upon verifying that the other servers have received the new message stream by receiving replies from the other servers to the first protocol messages, send a second protocol message from the first server to the other servers, instructing the other servers to begin processing the new message stream; and
  responsively to the second protocol message, add the new message stream to the multiple streams delivered to the recipients from the servers and cause the servers to deliver all the multicast messages from all the message streams to all the recipients in the same order.

16. The apparatus according to claim 15, wherein the multicast messages in each stream have respective sequence numbers, and wherein the first protocol messages identify a given sequence number of the multicast messages in the new message stream that was received by all of the servers in the group, and wherein the servers are configured to begin delivering the multicast messages in the new message stream beginning from the given sequence number.

17. The apparatus according to claim 16, wherein the first protocol messages identify respective sequence numbers of the multicast messages at which the servers are able to begin processing the new message stream, and wherein the given sequence number is identified as a maximum of the respective sequence numbers.

18. The apparatus according to claim 15, wherein the servers are configured to:
  detect at the first server that a given stream among the multiple streams of the multicast messages has been lost; and
  exchange third protocol messages between the first server and the other servers in the group so as to cause all the servers in the group to stop delivering the given stream following a last sequence number of the multicast messages in the given stream.

19. The apparatus according to claim 15, wherein the servers in the group are configured to synchronize the new message stream with the multiple streams so as to deliver all of the multicast messages to all the recipients in respective, identically-sequenced delivery streams.

20. The method according to claim 15, wherein the messages sources and the recipients are outside the group, and the streams of the multicast messages are received by the servers from the messages sources in an unsynchronized and unpredetermined order, and wherein the first and second protocol messages are exchanged only among the servers in the group.

\* \* \* \* \*